Aug. 23, 1955   C. D. NEWLAND ET AL   2,715,897
OVEN FOR PIT BARBECUE
Filed Oct. 25, 1952   3 Sheets-Sheet 1
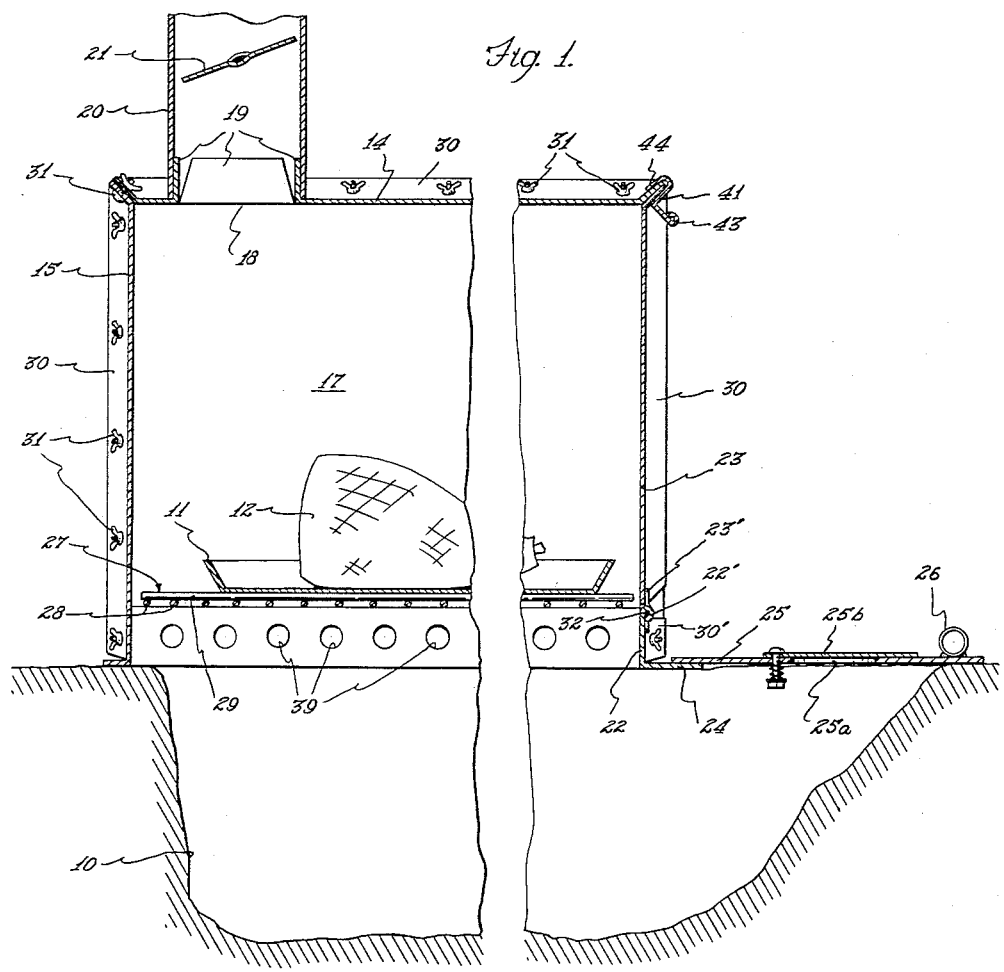
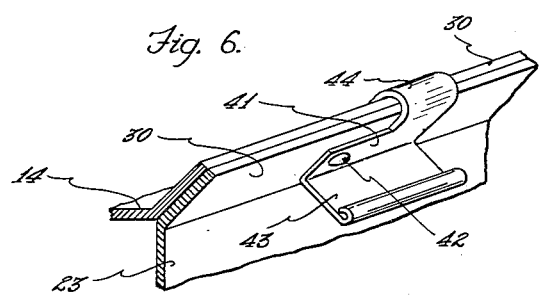
INVENTORS
Clarence D. Newland
Elmo L. Cranford
BY
Trehwells
Atty.

INVENTORS
Clarence D. Newland
Elmo L. Cranford
BY
Atty.

Aug. 23, 1955     C. D. NEWLAND ET AL     2,715,897
OVEN FOR PIT BARBECUE
Filed Oct. 25, 1952     3 Sheets-Sheet 3
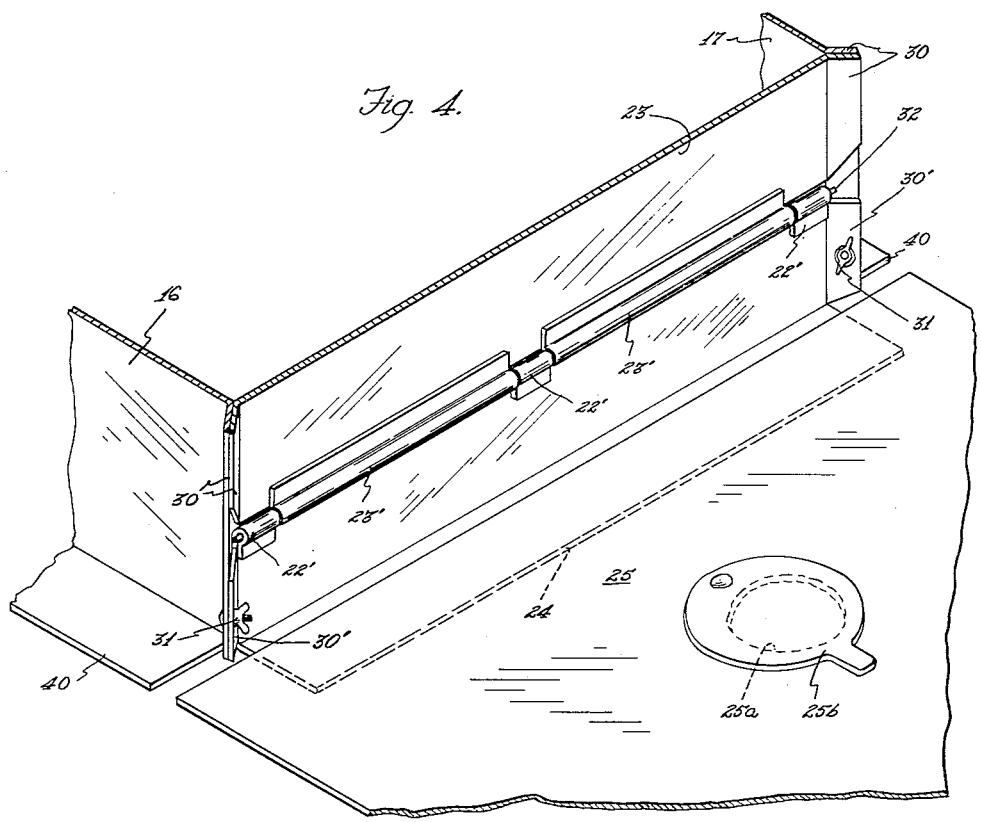
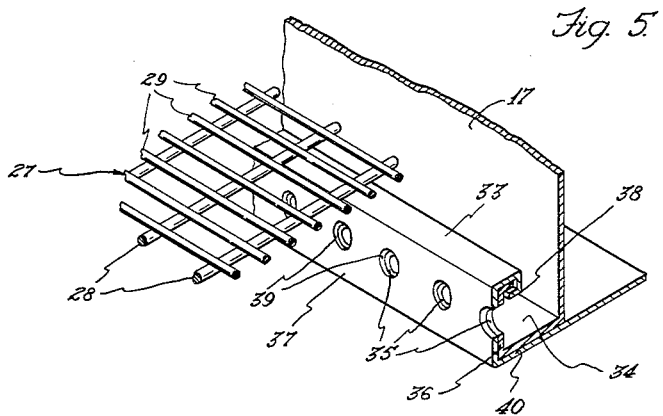
INVENTOR.
Clarence D. Newland
BY    Elmo L. Cranford
Atty.

United States Patent Office 2,715,897
Patented Aug. 23, 1955

2,715,897

OVEN FOR PIT BARBECUE

Clarence D. Newland, Coulee Dam, and
Elmo L. Cranford, Spokane, Wash.

Application October 25, 1952, Serial No. 316,924

4 Claims. (Cl. 126—29)

The present invention relates to improvements in an oven for pit barbecue.

The successful barbecuing of meats is only accomplished by utilizing the heat and smoke from a pit fire in such a manner that the meats are subjected to relatively low temperatures for cooking and kept in the atmosphere of the smoke from a wood fire to impart the desired flavor. It is the purpose of the present invention to provide an oven for pit barbecue which is of a simple knock-down construction and which will enable the user to so control the operation as to properly barbecue the meat with a minimum of difficulty.

Our invention contemplates the provision of an oven which comprises an open bottom shell, the top wall of which is provided with a smoke outlet on which a stove pipe or chimney is removably mounted. The shell is of such a nature that there is a foot flange to rest on the ground around the fire pit and to provide a ledge at the front of the oven for supporting a front cover for the fire pit. The shell itself is made up of flanged walls with the flanges extending diagonally outwardly from the meeting edges of the wall so that they may be clamped together readily and taken apart for transportation. With the shell the side walls have ledges to support a rack on which the pan containing the meat may be set. The construction is such that these ledges provide also the means for letting the smoky gases rise from the pit fire to bring them in contact with the meat and thus to flavor the meat.

The nature and advantages of our invention will appear more fully from the following description and the accompanying drawings wherein a preferred form of the invention is illustrated. It should be understood, however, that the drawings and description are illustrative only and are not intended to limit the invention except insofar as it is limited by the claims.

In the drawings:

Figure 1 is a longitudinal sectional view through an oven embodying our invention;

Figure 4 is a fragmentary perspective view of the front portion of the oven and part of the pit cover sheet;

Figure 5 is a fragmentary view illustrating how the food rack is supported within the oven and showing supporting flange on the oven; and Figure 6 is a detailed view illustrating the way in which the front door is held closed.

Figure 2:
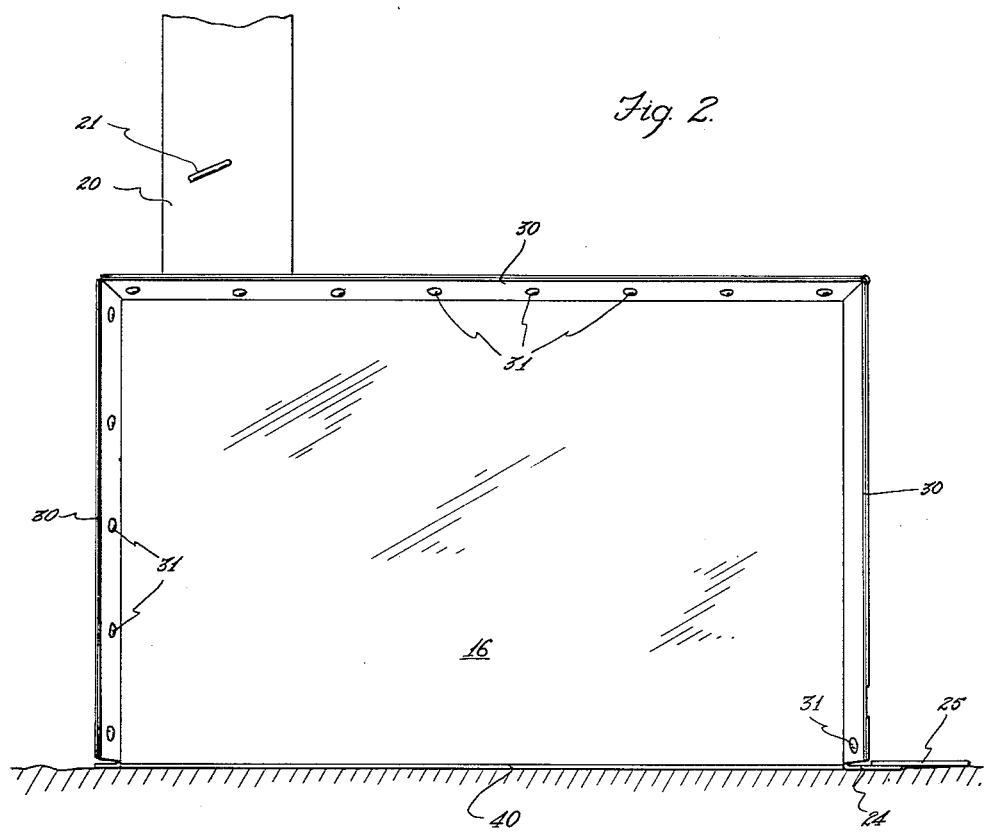
Figure 2 is a view in side elevation of the oven.

Referring now to the drawings, our improved oven for pit barbecue is shown in Figure 1 over a fire pit indicated generally at 10, with a pan 11 within the oven positioned to support a piece of meat 12 for barbecuing. In the art of barbecuing meat, it is essential that certain simple rules be followed. The pit must first be heated by building a fire within it and allowing the fire to burn down sufficiently to establish a bed of coals. The oven is then placed over the pit at least long enough to insure adequate heating of the oven. The meat is then prepared and placed within the oven and the fire within the pit is supplied with sufficient green wood of the desired type to flavor the meat so that a relatively slow burning, smoking fire will be maintained in the pit.

According to our invention, we provide an oven which is made up of a top wall 14, a rear wall 15 and side walls 16 and 17. The top wall 14 has an aperture 18 with turned up flanges of metal 19 on which a chimney or stove pipe 20 is removably supported. A damper 21 is provided in the stove pipe 20. The front of the shell has a cross bar 22 at the bottom and this cross bar has a door 23 hinged to it so that the door swings downwardly and outwardly for access to the oven. The fire pit 10 is always dug longer than the oven so that the wood may be fed into the pit from in front of the oven. The cross bar 22 has a forwardly extending lange 24 that forms a support for one edge of a pit cover 25. The pit cover has an air inlet 25a, and a spring held adjustable cover 25b over the inlet 25a to control the air supply. A handle 26 is provided on the cover 25. It is essential to provide adequate support for the meat pan within the oven in such a fashion that the smoky gases arising from the fire within the pit will be made to circulate over the pan and contact the meat. A rack 27 consisting of cross bars 28 and longitudinally running bars 29 is removably mounted in the oven at a level which will hold the pan slightly above the lower edge of the door 23.

One of the novel features of the present invention is the manner in which the walls 14, 15, 16 and 17, the bar 22 and the door 23 are formed to give them maximum rigidity and to enable them to be taken apart and transported in knock-down fashion. The meeting edges of the several walls, and the door are provided with outwardly and diagonally extending flanges 30. These flanges make angles of 45 degrees with the walls so that when the walls are put together, the flanges of any two meeting walls will lie parallel against each other. The flanges are removably clamped together by a simple clamping means 31 such as a screw bolt and a wing nut. The diagonal flanges 30 serve as stiffeners for the walls and yet permit the walls to nest or collapse into a flat package. The front bar 22 has its diagonal flanges 30' at the ends of the bar. The top edge portion 22' of the bar 22 and the lower edge portion 23' of the front door 23 are knurled over to provide hinges that are held by a hinge pin 32.

It will be appreciated that the pan for the meat will block most of the circulation area for the gases arising from the fire in the pit. The supporting load is mostly the weight of the pan and the weight of the rack 27. In order to insure adequate strength and support at the bottom of the oven, the side walls 16 and 17 are constructed with inner ledges 33 in the manner illustrated in Figure 5 of the drawings. The lower edge of each side wall is bent inwardly to provide a supporting portion 34 and then upwardly to provide the ledge 33. Apertures 35 are formed in the upwardly extending portion 36 between the ledge 33 and the bottom portion 34. A channel member 37 is provided with a re-entrant portion 38 so that it can be hooked over the ledge 33. There are two of these channel members 37, one for the wall 16 and the other for the wall 17. The channel members 37 have apertures 39 therein which align with the apertures 35 when the channel members are in place. The channel members 37 have bottom flanges 40 which extend outwardly beneath the portions 34 and beyond the walls 16 and 17 to rest on the ground around the pit 10 and provide a stable support for the oven.

Figure 3:
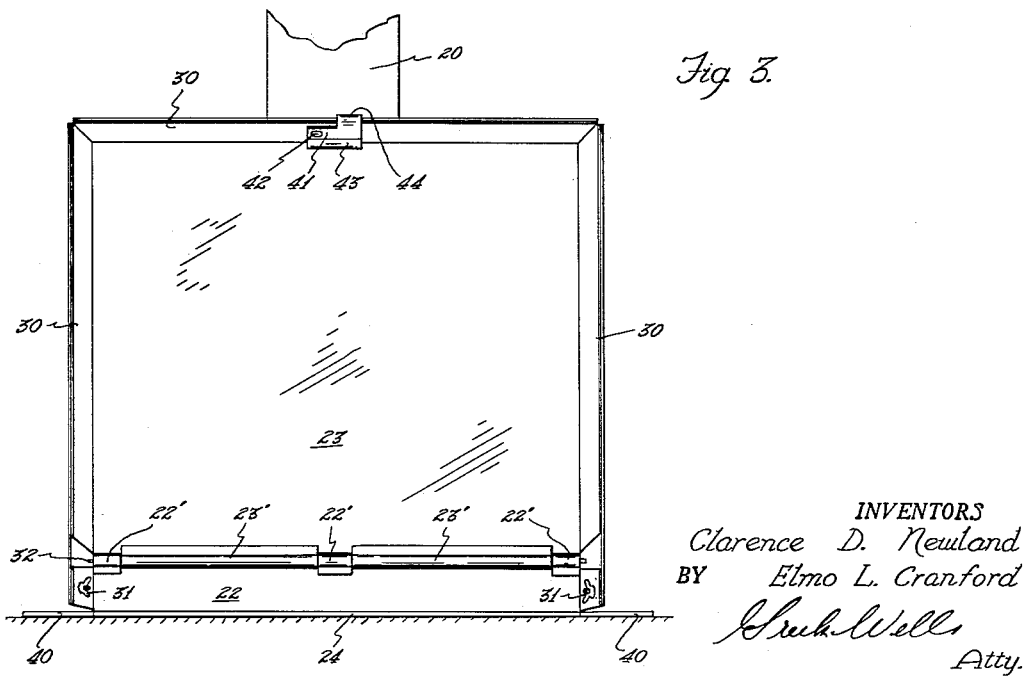
Figure 3 is a front view of the oven.

The door 23 is provided with a simple closing latch illustrated in Figures 1, 3 and 6 of the drawings. This latch comprises a plate 41 which is pivoted to the top flange 30 of the door 23 by a pivot pin 42. A handle 43 projects outwardly at right angles to the plate 41.

The plate 41 has a hook extension 44 which is adapted to hook over the flange 30 of the top wall 14.

It is believed that the nature and advantages of our invention will be apparent from the foregoing description. Having thus described our invention, we claim:

1. An oven for pit barbecue of foods comprising an open bottom sheet metal shell having a top wall provided with a smoke outlet and having a rear end wall and side walls secured to the top wall, a front lower bar connected to the lower front ends of said side walls, and a front door hinged along its lower edge to said bar, a reticulated food supporting rack in the shell, said shell having the lower portion of its side walls extended inwardly, then upwardly and outwardly to provide inwardly and upwardly extended ledges spaced inwardly from the side walls supporting the food rack, and supporting channels interlocked with said ledges and having bottom flanges projecting outwardly beneath and beyond the side walls for supporting the shell over a pit.

2. An oven for pit barbecue of foods comprising an open bottom sheet metal shell having a top wall provided with a smoke outlet and having a rear end wall and side walls secured to the top wall, a front lower bar connected to the lower front ends of said side walls, and a front door hinged along its lower edge to said bar, a reticulated food supporting rack in the shell, said shell having the lower portions of its side walls extended inwardly, then upwardly and outwardly to provide interior ledges spaced inwardly from the side walls supporting the food rack, the front bar having a forwardly projecting flange and a separate pit cover resting on the flange of said bar.

3. An oven for pit barbecue of foods comprising an open bottom sheet metal shell having a top wall provided with a smoke outlet and having a rear end wall and side walls secured to the top wall, a front lower bar connected to the lower front ends of said side walls, and a front door hinged along its lower edge to said bar, a reticulated food supporting rack in the shell, said shell having the lower portions of its side walls extended inwardly, then upwardly and outwardly to provide interior ledges spaced inwardly from the side walls supporting the food rack, the top wall, rear wall and side walls having edge flanges extending diagonally outward from their meeting edges, and connecting members clamping the flanges of the respective walls to each other where their edges meet.

4. An oven for pit barbecue of foods, comprising an open bottom sheet metal shell having a top wall provided with a smoke outlet and having a rear end wall and side walls secured to the top wall, a front lower bar connected to the lower front ends of said side walls, and a front door hinged along its lower edge to said bar, a reticulated food supporting rack in the shell, said shell having the lower portions of its side walls extended inwardly, then upwardly and outwardly to provide inwardly and upwardly extended ledges spaced inwardly from the side walls supporting the food rack, and supporting channels interlocked with said ledges and having bottom flanges projecting outwardly beneath and beyond the side walls for supporting the shell over a pit, the supporting channels and ledges being provided with aligned apertures for passage of the gases of combustion.

References Cited in the file of this patent

UNITED STATES PATENTS

| | | |
|---|---|---|
| 587,528 | Inman | Aug. 3, 1897 |
| 726,828 | Schmid | Apr. 28, 1903 |
| 970,501 | Holbrook | Sept. 20, 1910 |